(12) United States Patent
Lewis (10) Patent No.: US 11,556,967 B2
(45) Date of Patent: Jan. 17, 2023

(54) REDUCED BIAS SUBMISSION REVIEW SYSTEM

(71) Applicant: eduPresent LLC, Loveland, CO (US)

(72) Inventor: Jeffrey S. Lewis, Fort Collins, CO (US)

(73) Assignee: Bongo Learn, Inc., Loveland, CO (US)

( * ) Notice: Subject to any disclaimer, the term of this patent is extended or adjusted under 35 U.S.C. 154(b) by 296 days.

(21) Appl. No.: 17/117,416

(22) Filed: Dec. 10, 2020

(65) Prior Publication Data
US 2021/0090137 A1    Mar. 25, 2021

Related U.S. Application Data

(63) Continuation of application No. 15/954,210, filed on Apr. 16, 2018, now Pat. No. 10,891,665.

(51) Int. Cl.
*G06Q 30/02* (2012.01)

(52) U.S. Cl.
CPC ................ *G06Q 30/0282* (2013.01)

(58) Field of Classification Search
CPC .......................... G06Q 30/0282; G06Q 30/02
USPC ................................. 705/26.1, 347
See application file for complete search history.

(56) References Cited

U.S. PATENT DOCUMENTS

| | | | |
|---|---|---|---|
| 5,764,901 A | 6/1998 | Skarbo et al. | |
| 6,154,631 A | 11/2000 | Remschel | |
| 6,471,521 B1 | 10/2002 | Dornbush et al. | |
| 6,577,333 B2 | 6/2003 | Tai et al. | |
| 6,871,043 B2 | 3/2005 | Sand | |
| 7,403,910 B1 | 7/2008 | Hastings et al. | |
| 7,496,845 B2 | 2/2009 | Deutscher et al. | |
| 7,506,262 B2 | 3/2009 | Gupta et al. | |
| 7,735,101 B2 | 6/2010 | Lanza et al. | |
| 7,908,602 B2 | 3/2011 | Alcorn | |
| 8,108,255 B1 | 1/2012 | Robinson et al. | |
| 8,140,973 B2 | 3/2012 | Sandquist et al. | |
| 8,249,915 B2 | 8/2012 | Iams | |
| 8,255,280 B1 * | 8/2012 | Kay .................... | G06F 9/54 705/26.1 |

(Continued)

FOREIGN PATENT DOCUMENTS

| | | |
|---|---|---|
| WO | 2012/057835 | 5/2012 |
| WO | WO 2013/188290 | 12/2013 |

OTHER PUBLICATIONS

U.S. Appl. No. 15/954,210, filed Apr. 16, 2018.

(Continued)

*Primary Examiner* — Andrew Joseph Rudy
(74) *Attorney, Agent, or Firm* — Craig R. Miles; CR Miles P.C.

(57) ABSTRACT

A reduced bias submission review system distributed on one or more servers operably coupled to one or more client computing devices over a network supports a program including computer executable instructions accessible by browser based on-line processing to enable one or more clients to submit a plurality of submissions for submission review and depending on the application repeatedly serves the plurality of submissions in a prioritized order to a plurality of reviewers until each of the plurality of submissions receives a pre-selected target number of submission reviews or until each of the plurality of reviewers performs the preselected target number of submission reviews.

12 Claims, 9 Drawing Sheets

(56) References Cited

U.S. PATENT DOCUMENTS

| | | |
|---|---|---|
| 8,272,874 B2 | 9/2012 | Julia et al. |
| 8,312,276 B2 | 11/2012 | Chiou et al. |
| 8,473,835 B2 | 6/2013 | Hariton |
| 8,640,030 B2 | 1/2014 | Kulas |
| 8,696,364 B2 | 4/2014 | Cohen |
| 8,712,861 B2 | 4/2014 | Calabria |
| 8,782,706 B2* | 7/2014 | Ellis ............ H04N 5/445 725/50 |
| 8,806,320 B1 | 8/2014 | Abdo |
| 9,081,808 B1* | 7/2015 | Kiveris ......... G06Q 30/0251 |
| 9,459,754 B2 | 10/2016 | Lewis et al. |
| 9,588,955 B2 | 3/2017 | Rollins et al. |
| 9,729,395 B2* | 8/2017 | Anantharaman ....... H04N 7/15 |
| 10,257,557 B2* | 4/2019 | Triano .......... H04N 21/8133 |
| 10,424,000 B2 | 9/2019 | Chow |
| 10,467,920 B2 | 11/2019 | Lewis |
| 10,509,861 B2 | 12/2019 | Rollins et al. |
| 10,740,384 B2* | 8/2020 | Orr .............. G06F 16/3329 |
| 10,751,630 B2* | 8/2020 | MacCallum ......... A63F 13/65 |
| 10,891,665 B2* | 1/2021 | Lewis ............ G06Q 30/0282 |
| 2003/0036947 A1 | 2/2003 | Smith, III et al. |
| 2003/0073064 A1 | 4/2003 | Riggs |
| 2004/0143630 A1 | 7/2004 | Kaufmann et al. |
| 2004/0153504 A1 | 8/2004 | Hutchinson |
| 2004/0153508 A1 | 8/2004 | Alcorn et al. |
| 2007/0074116 A1 | 3/2007 | Thomas |
| 2007/0245243 A1 | 10/2007 | Lanza et al. |
| 2008/0208692 A1* | 8/2008 | Garaventi ......... G07F 17/0014 705/40 |
| 2009/0112683 A1* | 4/2009 | Hamilton, II ...... G06Q 30/0203 705/7.32 |
| 2009/0119258 A1 | 5/2009 | Petty |
| 2009/0164904 A1 | 6/2009 | Horowitz |
| 2010/0251177 A1 | 9/2010 | Geppert et al. |
| 2010/0274847 A1 | 10/2010 | Anderson et al. |
| 2010/0293478 A1 | 11/2010 | Dahlgren |
| 2011/0026898 A1 | 2/2011 | Lussier et al. |
| 2012/0036423 A1 | 2/2012 | Haynes et al. |
| 2016/0269345 A1 | 9/2016 | Weizman |
| 2016/0381408 A1* | 12/2016 | Triano ............ H04N 21/8549 725/10 |
| 2021/0056479 A1* | 2/2021 | Olsen ............. G06Q 10/0637 |

OTHER PUBLICATIONS

U.S. Appl. No. 15/954,210; Office Action dated Jun. 26, 2020.
PCT International Patent Application No. PCT/US18/28179; International Search Report and Written Opinion of the International Searching Authority dated Jun. 27, 2018, 12 pages.
Canadian Patent Application No. 2,914,902; Office Action dated Oct. 9, 2018, 11 pages total.
Canadian Patent Application No. 2,949,204; Office Action dated Nov. 20, 2018, 3 pages total.
Australian Patent Application No. 2017201408; Office Action dated Jan. 14, 2019, 6 pages total.
APSOLON. Video Tips & Tricks ep. 09: How to add YouTube Annotations, Mar. 6, 2009, YouTube, https://www.youtube,com.watch?v=XAG3z4scWTw.
U.S. Appl. No. 14/480,509, filed Sep. 8, 2014.
U.S. Appl. No. 15/284,408, filed Oct. 3, 2016.
U.S. Appl. No. 61/658,298, filed Jun. 11, 2012.
International Patent Cooperation Treaty Patent Application No. PCT/US2011/001820, filed Oct. 27, 2011.
U.S. Appl. No. 61/441,670, filed Feb. 11, 2011.
U.S. Appl. No. 61/407,548, filed Oct. 28, 2010.
PCT International Patent Application No. PCT/US15/14493; International Search Report and Written Opinion dated May 14, 2015, 14 pages total.
U.S. Appl. No. 13/842,846; Office Action dated Dec. 31, 2014.
APPLE. iPhone User Guide For iOS 4.2 Software; Copyright 2010, 5 total pages (excerpt).
ZeeBigBang. FORscene Tutorial (full). Vimeo. N.p., Oct. 14, 2010. Website, https://vimeo.com/15836683, originally downloaded Sep. 1, 2015, 1 page.
European Patent Application No. 18915584.9.6, Extended European Search Report dated Dec. 13, 2021, 6 pages.

* cited by examiner

REDUCED BIAS SUBMISSION REVIEW SYSTEM

This United States Patent Application is a continuation of U.S. patent application Ser. No. 15/954,210, filed Apr. 16, 2018, now U.S. Pat. No. 10,891,665, issued Jan. 12, 2021, hereby incorporated by reference herein.

I. FIELD OF THE INVENTION

A reduced bias submission review system distributed on one or more servers operably coupled to one or more computing devices over a network to support a program including computer executable instructions to enable one or more submitter computing devices to submit a plurality of submissions for submission review and repeatedly serve the plurality of submissions in a prioritized order to a plurality of reviewer computing devices until each of the plurality of submissions receives a pre-selected target number of submission reviews or until each of a plurality of reviewers performs a preselected target number of submission reviews.

II. SUMMARY OF THE INVENTION

An object of particular embodiments of the invention can be to provide a reduced bias submission review system distributed on one or more servers operably coupled to one or more computing devices over a network including a program including computer executable instructions to enable one or more submitter computing devices to submit a plurality of submissions for submission review which can be repeatedly served in a prioritized order to a plurality of reviewer computing devices.

Another object of particular embodiments of the invention can be to provide computer implemented reduced bias submission review program executable to repeatedly serve a plurality of submissions in reduced bias prioritized order to a plurality of reviewer computing devices until a pre-selected target number of submission reviews have accrued to each of the plurality of submissions or to each of the plurality of reviewers, or combinations thereof.

Another object of particular embodiments of the invention can be to provide computer implemented reduced bias submission review program executable to enable one or more administrator computing devices to submit one or more assignments designating submission review of submissions received from each of a plurality of submitter computing devices in fulfillment of the assignment and which repeatedly serves a plurality of submissions in a reduced bias prioritized order to a plurality of reviewer computing devices in fulfillment of submission review.

Another object of particular embodiments of the invention can be a method in a system to distribute a plurality of submissions in reduced bias prioritized order to a plurality of reviewer computing devices for submission review until a pre-selected target number of submission reviews have accrued to each of the plurality of submissions or to each of the plurality of reviewers, or combinations thereof.

Naturally, further objects of the invention are disclosed throughout other areas of the specification, drawings, photographs, and claims.

IV. DETAILED DESCRIPTION OF THE INVENTION

Generally, referring to FIGS. 1 through 9, a reduced bias submission review system (1) (also referred to as the "system (1)") can be distributed on one or more servers (2) operably coupled to one or more administrator computing devices (3), one or more submitter computing devices (4) or one or more reviewer computing devices (5) by a public network (6), such as the Internet (7), a cellular-based wireless network(s) (8), or a local network (9) (collectively referred to as the "network (10)"). The network (10) supports a reduced bias submission review program (11) contained in a non-transitory computer readable media (2A) of one or more servers (2) (also referred to as the "program (11)"). The program (11) includes computer executable instructions accessible by browser based on-line processing by at least one of: the administrator computing device (3), a submitter computing device (4), or a reviewer computing device (4). In particular embodiments, the program (11) enables one or more administrators (12) to submit an assignment (13) designating submission review (14) of one or more submissions (15) to the server (2) and enables a plurality of submitters (16) to correspondingly submit a plurality of submissions (15) to the server (2) and enables a plurality of reviewers (17) to receive a plurality of submissions (15) from the server (2) and correspondingly submit a plurality of submission reviews (18) to the server (2). In particular embodiments, the program (11) associates a pre-selected target number (19) of submission reviews (18) to each of the plurality of submissions (15) or associates a preselected target number (19) of submission reviews (18) to each of the plurality of reviewers (17), and repeatedly serves the plurality of submissions (15) in a prioritized order (20) to the plurality of reviewers (17) until each of the plurality of submissions (15) receives the pre-selected target number (19) of submission reviews (18), or the until each of the plurality of reviewers (17) performs the preselected target number (19) of submission reviews (18).

Figure 1:
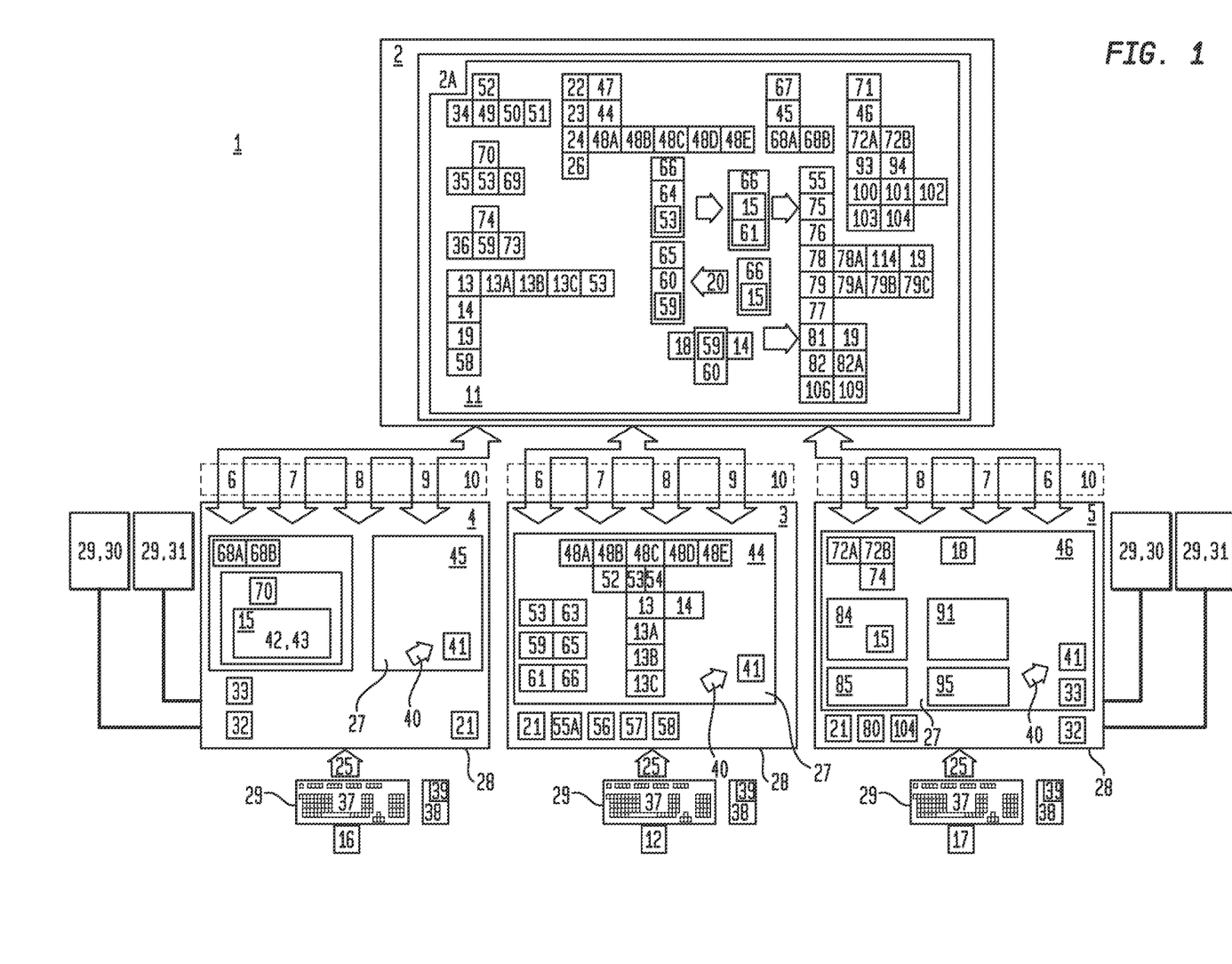
FIG. 1 is block diagram of a particular embodiment of a reduced bias submission review system distributed on one or more servers operably coupled to one or more computing devices by a network.

Now referring primarily to FIG. 1, each of the one or more administrator computing devices (3), one or more submitter computing devices (4) and the one or more reviewer computing devices (5) can include an Internet browser (21) (also referred to as a "browser"), such as: Microsoft's INTERNET EXPLORER®, GOOGLE CHROME®, MOZILLA®, FIREFOX®, or the like, which functions to download and render multimedia content that is formatted in "hypertext markup language" (HTML).

In the system (1), the one or more servers (2) can contain the program (11) including a graphical user interface module (22) which implements the most significant portions of one or more graphical user interface(s) (23) including one or more menus (24) including a combination of text and symbols to represent options selectable by user command (25) to execute the functions of the program (11). As to these embodiments, the one or more administrator computing devices (3) submitter computing devices (4) or the one or more reviewer computing device (5) can use the Internet browser (21) to depict a graphical user interface (23) including selectable menus (24) and computing device content (26) and to relay selected user commands (25) back to the one or more servers (2). The one or more servers (2) can respond by formatting additional menus (24) for the respective graphical user interfaces (23) (as shown in the illustrative examples of FIGS. 2 through 9).

Again, referring primarily to FIG. 1, in particular embodiments, the one or more servers (2) can be used primarily as sources of computing device content (26), with primary responsibility for implementing the graphical user interface (23) being placed upon each of the one or more administrator, submitter or reviewer computing devices (3)(4)(5). As to these embodiments, each of the one or more administrator, submitter, or reviewer computing devices (3)(4)(5) can download and run the appropriate portions of the program (11) implementing the corresponding functions attributable to the administrator computing device (3), submitter computing device (4) or the review computing device (5) (as shown in the illustrative examples of FIGS. 2 through 9).

Again, referring primarily to FIG. 1, the administrator computing device (3), submitter computing device (4) or the reviewer computing device (5) can include as illustrative examples: desktop computer devices, mobile computer devices such as personal computers, slate computers, tablet or pad computers, cellular telephones, personal digital assistants, smartphones, programmable consumer electronics, or combinations thereof. A display surface (27), such as the graphical display surface, provided by a monitor screen or other type of display device (28) can also be connected to administrator computing device (3), the submitter computing device (4) or the reviewer computing device (5). In addition, each of the one or more administrator, submitter, or reviewer computing devices (3)(4)(5) can further include peripheral input devices (29) such as: an image capture device (30), as illustrative examples: a camera, video camera, web camera, mobile phone camera, video phone, or the like, and an audio capture device (31) such as microphones, speaker phones, computer microphones, or the like. The audio capture device (31) can be provided separately from or integral with the image capture device (30). An image capture device (30) and an audio capture device (31) can be connected to the administrator computing device (3), submitter computing device (4) or the reviewer computing device (5) by an image capture interface (32) and an audio capture interface (33) respectively.

For the purposes of this invention, the term "administrator" means any person having an administrator account (34) which allows access to resources provided by or connected to the system (1).

For the purposes of this invention, the term "submitter" means any person having a submitter account (35) which allows access to resources provided by or connected to the system (1).

For the purposes of this invention, the term "reviewer" means any person having a reviewer account (36) which allows access to resources provided by or connected to the system (1).

An administrator (12), a submitter (16) or a reviewer (17) may enter commands and information into a corresponding one or more of the administrator computing devices (3), submitter computing devices (4) or reviewer computing devices (5) through peripheral input devices (29) such as a keyboard (37) or a pointing device (38) such as a mouse; however, any method or device that converts user action into commands and information can be utilized including, but not limited to: a microphone, joystick, game pad, touch screen, or the like.

A "user command (25)" occurs when an administrator (12), a submitter (16) or a reviewer (17) operates an application function of the program (11) through the use of a command, for example, pressing or releasing a mouse button (39) while a pointer (40) is located over a control icon (41) (or other interactive field which activates a function) displayed in a graphical user interface (23) displayed on the display surface (27) of the a computing device (3)(4)(5). However, it is not intended that a "user command (25)" be limited to the press and release of the mouse button (39) while a pointer (40) is located over a control icon (41) (or field) in a graphical user interface (23), rather, a "user command" is intended to broadly encompass a command by an administrator (12), a submitter (16) or a reviewer (17) through which a function of the program (11)(or other program, application, module or the like) which implements graphical user interface (23) can be activated or performed, whether through selection of one or a plurality of control icon(s) (41) or fields, or by user voice command, keyboard stroke, mouse button, or otherwise.

Again, referring primarily to FIG. 1, embodiments of the system (1) allows an administrator (12), a submitter (16) or a reviewer (17) to submit any type or kind of electronic media content (42) generated by a computer capable of electronic data interchange regardless of the file format including as illustrative examples electronic text or graphics, video recordings, audio recordings, multimedia presentations, slide presentations, spreadsheets, or combinations thereof. A submitter (16) can submit a submission (15) of media content (42) an in particular embodiments, including video content (43). While illustrative examples of FIGS. 2 through 9 include video content (43), this is not intended to preclude embodiments in which the submission (15) comprises other types or kinds of electronic media content (42). The submission (15) including electronic media content (42) (whether in the form of video content (43) or other electronic media content) can be stored in the submitter computing device (4), or can be transferred for retrievable storage to a server (2) in the system (1). In particular embodiments, the submitter (16) can utilize an image capture device (30) to record moving visual images and can, but need not necessarily, utilize an audio capture device (31) (whether separate or integral with the image capture device (30)) to record sound which can be associated with the visual images. The image capture device (30) and the audio capture device (31)

can be integral or separate from the submitter computing device (3). In particular embodiments, the video content (43) can comprise visual image content associated with audio content of an oral presentation recorded and converted to an appropriate file in the appropriate format and retrievably stored by the submitter computing device (4) or transferred and retrievably stored by a server (2) in the system (1).

Now referring primarily to FIGS. 1 through 9, which provide illustrative examples of an administrator graphical user interface (44), a submitter graphical user interface (45) and a reviewer graphical user interface (46); however, these illustrative examples are not intended to preclude other embodiments which by user command (25) activate the corresponding functionalities of the program (11). In general, the graphical user interfaces (23)(44)(45)(46) described can be implemented using various technologies and different devices, depending on the preferences of the designer and the particular efficiencies desired for a given circumstance.

Now referring primarily to FIG. 1, in particular embodiments, the program (11) can include an administrator module (47) accessible or downloadable to an administrator computing device (3) to depict an administrator graphical user interface (44) on the display surface (27) of an administrator computing device (3).

Again, referring primarily to FIG. 1, embodiments of the administrator module (47) can, but need not necessarily, function upon execution to depict an administrator sign up menu (48A) which by user command (25) allows administrator (12) to create an administrator account (34) under which the administrator (12) can be authenticated by the system (1) by an administrator identifier (49) and correspondingly receive authorization to access resources provided by or connected to the system (1) and access further administrator menus (48A through 48E) in the administrator graphical user interface (44) and the associated administrator database (50) referenced to the administrator identifier (49). The administrator sign up menu (48A) can further function to maintain an administrator identifier database (51) containing a plurality of administrator identifiers (49) associated with a corresponding plurality of administrators (12) that can be authenticated by the system (1).

Again, referring primarily to FIG. 1, embodiments of the administrator module (47) can, but need not necessarily, upon execution depict an administrator log in menu (48B) which by user command (25) allows the administrator (12) to log in to the administrator account (34). To log in to an administrator account (34), an administrator (12) authenticates oneself with an administrator password (52) or other credentials, such as fingerprint or facial recognition, for the purposes of accounting, security, and resource management. Once the administrator (12) has logged on, the system (1) will often use the administrator identifier (49) rather than a username, through a process known as identity correlation.

Again, referring to primarily to FIG. 1, particular embodiments of administrator module (47) can, but need not necessarily, function to depict an administrator assignment menu (48C) in which the administrator (12) by user command (25) can generate one or more assignments (13) each including one or more assignment events (13A) and fill each with an assignment description (13B), assignment content (13C), or a description of one or more submissions (15) to be submitted by a submitter (16). The assignment menu (48C) can, by user command (25), be further executed to allow one or more submitter identifiers (53) (each having an assignment (13) in common) to be associated with an assignment group identifier (54). The one or more assignments (13) can be subsequently accessed by or received by submitters (16) by use of the submitter identifier (53) associated with an assignment (13).

Again, referring primarily to FIG. 1, the administrator module (47) can further function to depict in the administrator graphical user interface (44) a submission review initiation icon (55A) which by user command (25) can activate a submission review module (55) of the program (11). The submission review initiation icon (55A) can be depicted in association with an assignment (13), an assignment event (13A), or the description of a submission (13C), or otherwise, such that by user command (25) the submission review module (55) can be activated or deactivated as to each particular submission (15). In the example of FIG. 1, the submission review initiation icon (55A) which can take the form of binary response to an the review inquiry (56) depicted in the administrator graphical user interface (44) as "Review Required (Y/N)" depicted during the generation of the assignment (13) and user command (25) takes the form of key stroke "Y" or "N"; however, this is not intended to preclude embodiments in which the user command (25) takes another form, such as user of a pointer (40) and press of a mouse button (39).

Again, referring primarily to FIG. 1, in particular embodiments, the submission review module (55) can further function to depict in the administrator graphical user interface (44) a preselected target number icon (57) which by user command in the administrator graphical user interface (44) can establish a preselected target number (19) of submission reviews (18) to each of the plurality of reviewers (17) correspondingly associated to a plurality of reviewer identifiers (59) allocated to a common reviewer roster identifier (60), or to each of the plurality of submissions (15) correspondingly associated to a plurality of submission identifiers (61) allocated to a common submission group identifier (62). In particular embodiments, the preselected target number (19) can be the same or different between a plurality of reviewers (17), or between a plurality of submissions (15). In particular embodiments, the submission review preselected target number icon (57) can take the form of an instruction depicted in the administrator graphical user interface (44) to enter the preselected target number (19) such as "Specify the number of submission reviews" and the user command (25) can take the form of a keystroke to enter a target numerical value (58). In particular embodiments, the preselected target number (19) can be associated with each submission (15) included in an assignment (13).

Again, referring primarily to FIG. 1, in particular embodiments, by user command (25) in the administrator graphical user interface (44), an administrator (12) can further select one or more submitter identifiers (53) to include in each of one or more submitter groups (63). For the purposes of this invention, the term "submitter group (63)" means a plurality of submitter identifiers (53) allocated to a common submitter group identifier (64). In particular embodiments, the selection of the submitter identifiers (53) included in a submitter group (63) can be automated by default settings of the administrator module (47) which can function to allocate submitter identifiers (53) in random order to one of a plurality of submitter groups (63), or allocate submitter identifiers (53) to a submitter group (63) based on prior consent of a submitter (16) to have the associated submitter identifier (53) included in a submitter group (63), or can allocate submitter identifiers (53) to a submitter group (63) by reference to submitter identifiers (53) associated in common with an assignment (13), or can function to allow the administrator (12) to individually select submitter identifiers (53) and allocate the selected submitter identifiers (53) to a submitter group (63).

Again, referring primarily to FIG. 1, in particular embodiments, by user command (25) in the administrator graphical user interface (44), an administrator (12) can select one or more reviewer identifiers (59) to include in one or more rosters of reviewers (65). For the purposes of this invention, the term "roster of reviewers (65)" means a plurality of reviewer identifiers (59) allocated to a common reviewer group identifier (60). In particular embodiments, the selection of the reviewer identifiers (59) included in a roster of reviewers (65) can be automated by default settings of the administrator module (47) which function to allocate reviewer identifiers (59) in random order to one of a plurality of rosters of reviewers (65), or allocate reviewer identifiers (59) to a roster of reviewers (65) based on prior consent of a reviewer (17), or can function to allow the administrator (12) to individually select reviewers (17) and allocate the selected reviewers (17) to roster of reviewers (65).

In particular embodiments, by user command (25) in the administrator graphical user interface (44), the administrator module (47) can be further executed to associate each one of a plurality of submissions (15) received by the server (2) from a corresponding plurality of submitters (16) to a common group identifier (62) to create a submission group (66). For the purposes of this invention, the term "submission group" means a plurality of submission identifiers (61) allocated to a common submission group identifier (62). The allocation of the plurality of submissions (15) to each submission group (66) can be automated by default settings of the administrator module (47) which can function to allocate each of the plurality of submissions (15) in random order to one of a plurality of submission groups (66), or each one of the plurality of submissions (17) can be associated with a submission group (66) based on the submitter identifier (53) associated with each of the plurality of submissions (15) used as reference to a particular submission group (66), or by consent of a submitter (16) to have a submission (15) included in a submission group (66), or the administrator (12) can individually select the submission (15) and allocate the selected submission (15) to a submission group (66) by user command (25) in the administrator graphical user interface (44). In particular embodiments, the submission group (66) will include submissions (15) only from submitters (16) in an associated submitter group (63).

Now referring primarily to FIG. 1, embodiments of the program (11) can include a submitter module (67) accessible or downloadable to a submitter computing device (4) to depict a submitter graphical user interface (45) on the display surface (27) of a submitter computing device (4).

Again, referring primarily to FIG. 1, in particular embodiments the submitter module (67) upon execution can depict a submitter sign up menu (68A) which by user command (25) allows the submitter (15) to create a submitter account (35) under which the submitter (15) can be authenticated by the system (1) by a submitter identifier (53) and correspondingly receive authorization to access resources provided by or connected to the system (1). The submitter module (67) can further function to maintain a submitter identifier database (69) containing a plurality of submitter identifiers (53) associated with a corresponding plurality of submitters (16) that can be authenticated by the system (1).

Again, referring primarily to FIG. 1, embodiments of the submitter module (67) can, but need not necessarily, further function to depict a submitter log in menu (68B) which by user command (25) allows the submitter (16) to log in to a submitter account (35). To log in to a submitter account (35), a submitter (16) authenticates oneself with a submitter password (70) or other credentials, such as fingerprint or facial recognition, for the purposes of accounting, security, and resource management. Once the submitter (16) has logged on, the system (1) will often use the submitter identifier (53) rather than a username, through a process known as identity correlation.

In an illustrative example, a submitter (16) can sign up or log in to the system (1) as one of plurality of submitters (16) of a submitter group (63) having a common objective such as class or an assignment (13) which requires submission review (14) of one more submissions (15) by one or more reviewers (17). The submitter sign up menu (68A) or login menu (68B) can further function by user command (25) to associate a submitter group identifier (64) in common to each of the plurality of submitters (16) in a submitter group (63), the submitter group identifier (64) can, but need not necessarily, act as reference to search the submitter identifier database (69) to return all the submitters (16) included in a submitter group (63).

Now referring primarily to FIG. 1, embodiments of the program (11) can include a reviewer module (71) accessible or downloadable to a reviewer computing device (5) to depict a reviewer graphical user interface (46) on the display surface (27) of a submitter computing device (5).

Again, referring primarily to FIG. 1, in particular embodiments the reviewer module (71) upon execution can depict a reviewer sign up menu (72A) which by user command (25) allows the reviewer (17) to create a reviewer account (36) under which the reviewer (17) can be authenticated by the system (1) by a reviewer identifier (59) and correspondingly receive authorization to access resources provided by or connected to the system (1). The reviewer module (71) can further function to maintain a reviewer identifier database (73) containing a plurality of submitter identifiers (59) associated with a corresponding plurality of reviewers (17) that can be authenticated by the system (1).

Again, referring primarily to FIG. 1, embodiments of the reviewer module (71) can, but need not necessarily, further function to depict a reviewer log in menu (72B) which by user command (25) allows the reviewer (17) to log in to a reviewer account (36). To log in to a reviewer account (36), a reviewer (17) authenticates oneself with a reviewer password (74) or other credentials, such as fingerprint or facial recognition, for the purposes of accounting, security, and resource management. Once the reviewer (17) has logged on, the system (1) will often use the reviewer identifier (59) rather than a username, through a process known as identity correlation.

In an illustrative example, reviewers (17) can sign up or log in to the system (1) as one of plurality of reviewers (17) of a roster of reviewers (65) having a common objective such as class or an assignment (13) which requires submission review (14) by one or more reviewers (17). The reviewer sign up menu (72A) or reviewer login menu (72B) can further function by user command (25) to associate a reviewer group identifier (60) in common to each of the reviewers (17) in a roster of reviewers (65), the reviewer group identifier (60) can, but need not necessarily, act as reference to search the reviewer identifier database (73) to return all the reviewers (17) included in a roster of reviewers (65).

Now referring primarily to FIG. 1, in particular embodiments, the submission review module (55) of the program (11) can further include a submission receiving module (75) which functions to receive one or a plurality of submissions (15) through the network (10) from one or a plurality of submitters (16), and by execution of a submission group generator module (76), the one or the plurality of submissions (15) can be allocated to one or between a plurality of submission groups (66), and a submission server module (77) can be executed to serve the one or the plurality of submissions (15) in a submission group (66) through the network (10) to a roster of reviewers (65) associated with a reviewer group identifier (60). Based on the pre-selected target number (19) associated with each reviewer (17) in the roster of reviewers (65) or associated with each of the plurality of submissions (15) within a submission group (66), the submission server module (75) can be executed to repeatedly serve each of the plurality of submissions (15) in a submission group (66) to the roster of reviewers (65) until each of the plurality of submissions (15) in a submission group (66), or each of the reviewers (17) in a roster of reviewers (65) receives the pre-selected target number (19) of submission reviews (14).

Again referring primarily to FIG. 1, in particular embodiments, the submission review module (55) can include a submission priority order module (76) executable to serve the plurality of submissions (15) in a submission group (66) associated with a common submission group identifier (62) to the plurality of reviewers (17) in roster of reviewers (65) associated with a reviewer group identifier (60) in a prioritized order (20). In particular embodiments, the submission priority order module (76) functions to prohibit review of a submission (15) by the submitter (16) of the submission (15). In particular embodiments, the submission priority order module (78) can further function to determine the submission date (78A) associated with each one the plurality of submissions (15) within a submission group (66) associated with a common submission group identifier (62) and serve the plurality of submissions (15) in the submission group (66) to a roster of reviewers (65) associated with a common reviewer group identifier (60) based on having an earliest submission date (78A). In particular embodiments, the submission priority order module (78) can further function to determine a number of submission reviews (14) associated with each submission (15) in the submission group (66) and serve the plurality of submissions (15) in the submission group (66) to the roster of reviewers (65) based on having a fewest number of submission reviews (14) within the submission group (66). In particular embodiments, the submission priority order module (78) can further include submission review rank module (79) which generates a plurality of submission review ranks (79A) corresponding to the pre-selected target number (19) of submission reviews (18). As to these embodiments, the submission server module (75) repeatedly serves each of the plurality of submissions (15) in the submission group (66) to the roster of reviewers (65) until each one of the plurality of submissions (15) in the submission group (66) receives a submission review (18) in a first one of the plurality of submission review ranks (79B) prior to serving each of the plurality of submissions (15) in the submission group (66) to the roster of reviewers (65) in a second one of the plurality of submission review ranks (79C).

As an illustrative example, a reviewer (17) can login to the system (1) by user command (25) in the reviewer graphical user interface (46). The reviewer module (71) can depict a submission review icon (80) which by user command (25) activates the submission server module (77) which serves one of the submissions (15) included a submission group (66), and as to particular embodiments, serves a submission (15) from the submission group (66) associated with the roster of reviewers (65). In particular embodiments, a reviewer (17) by user command (25) in the reviewer graphical user interface (46) can be served additional submissions (15) for submission review (14), even if the reviewer does not perform a submission review (14) of the prior served submission (15) (shown in the example of FIG. 7 the user command (25) takes the form of a click event on a "Next Review" icon (104). In the event that no submissions (15) are available for submission review (14), then the submission priority order module (76) can function to depict a message that no submissions available for review. In particular embodiments, prior to serving a submission (15), the submission priority order module (76) can function to determine a number of submission reviews (14) associated with each one of the plurality of submissions (15) within the submission group (66), and can, but need not necessarily, further determine the submission date (78A) associated with each one the plurality of submissions (15) within the submission group (66). Accordingly, a submission (15) of a submitter (16) should not be served to the submitter (15) acting as a reviewer (17). If all the submissions have the same submission date (78A) and the same number of submission reviews (14), then a plurality of submissions (15) can be served in any order or based on random selection. If the plurality of submissions (15) within a submission group (66), have received an equal number of submission reviews (14), then, the submission (15) having earliest submission date (78A) can be served in priority over those submissions (15) within the submission group (66) have a later submission date (78A). If the submissions (15), have received a different number of submission reviews (14), then, the submission(s) (15) having the fewest number of submission reviews (14) can be served in priority order over those have a greater number of submission reviews (14), and where a plurality of submissions (15) have in common the fewest number of submission reviews (14), then in priority order by the earliest submission date (78A). In particular embodiments, each submission (15) in a submission group (66) receives the same integer number of submission reviews (14) prior to receiving additional submission reviews (14).

In particular embodiments, the submission review module (55) can further include a submission review allocation module (81) executable to associate each submission review (14) with the reviewer (17) within roster of reviewers (65) having performed the submission review (14). In the event that a preselected target number (19) of submission reviews (14) have been associated with a reviewer (17), then the submission review priority order module (76) can function to serve the plurality of submissions (15) within the submission group (66) to the reviewer (17) within the roster of reviewers (65) having the fewest submitted submission reviews (14). In particular embodiments, the submission review priority module (78) can function to serve submissions (15) for submission review (14) based only on the basis of determining the reviewer (17) within a roster of reviewers (65) having the fewest number of submitted submission reviews (14), or in further coordination with priority ordering of a plurality of submissions (15) in a submission group (65), as above described.

Again, referring primarily to FIG. 1, in particular embodiments, the submission review module (55) can further include a submission review edit module (82) which functions retrieve submission reviews (14) performed by a reviewer (17), serve the submission review (14) by operation of the submission server module (77) to the associated reviewer (17) and receives edits (82A) of the submission reviews (14) from the reviewer (17).

Now referring primarily to FIGS. 2 through 7, which illustrate a particular method in the system (1) of reviewing a plurality of submissions (15). Now referring primarily to FIG. 2, subsequent to sign up and login to access the resources provided by or connected to the system (1), the reviewer module (71) functions to depict the reviewer graphical user interface (46) on the display surface (27) of the reviewer computing device (5). The reviewer graphical user interface (46) can include a submission viewer (83) including a submission display area (84) and submission display controls (85).

Figure 2:
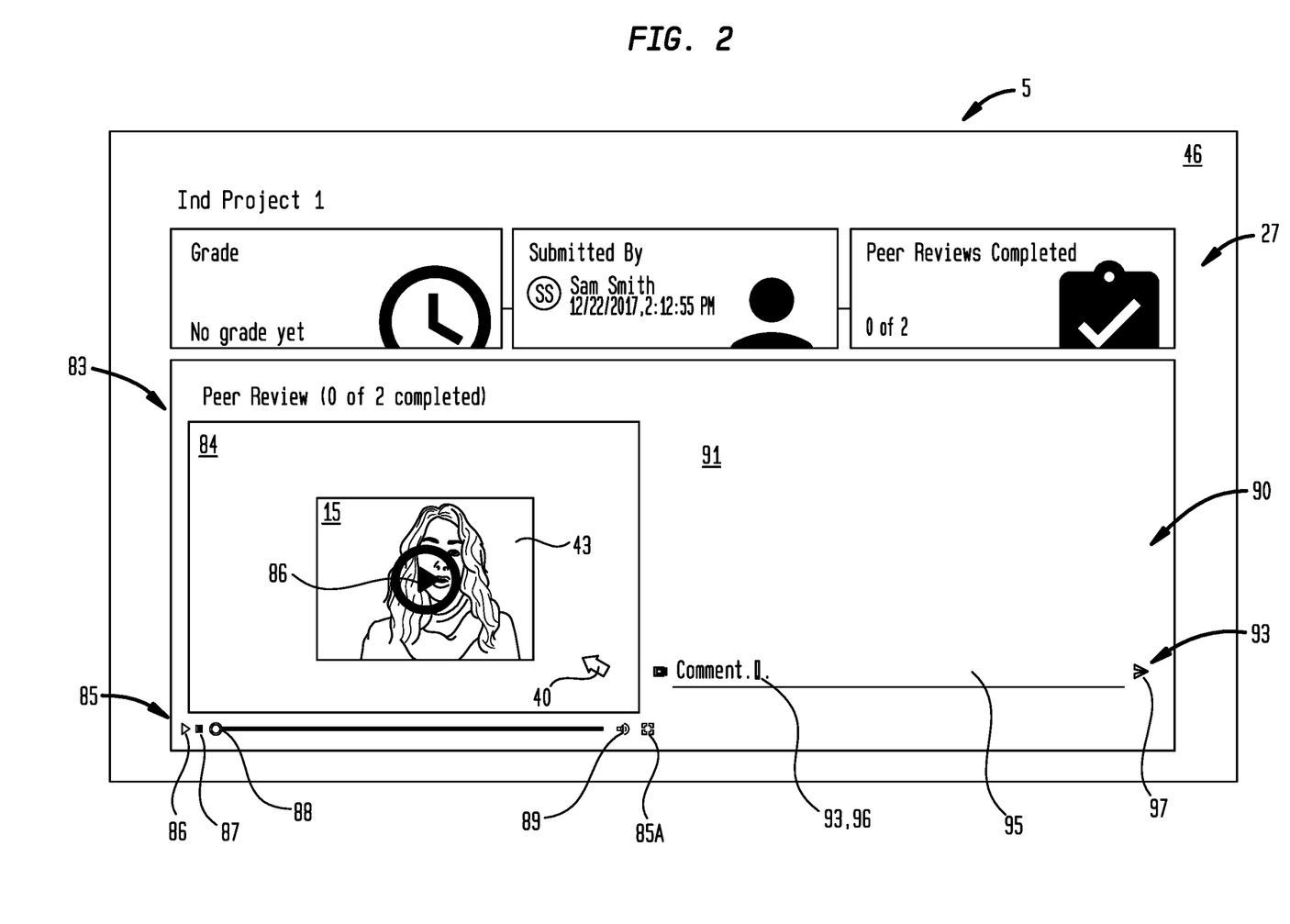
FIG. 2 is an illustration of a particular embodiment of a reviewer graphical user interface depicted on a display surface of a computing device.

In the illustrative example of FIG. 2, the submission (15) can be video content (43) depicted in the submission display area (84) and the submission display controls (85) can include a play control (86), pause control (87), seek control (88), volume control (89) or other controls (85A) necessary to control presentation of the video content (43); however, this illustrative example is not intended to preclude embodiments in which the submission viewer (83) displays a submission (15) other than a video content (43) and the submission display controls (85) can include control elements coordinated with the type or kind of submission (15) depicted in the submission display area (84). For example, the submission (15) can be a document and the submission display controls (85) can include scroll bar, page up and down control, spelling checker, grammar checker, word count, or the like.

Again, referring to FIG. 2, the reviewer module (71) can depict in the reviewer graphical user interface (46) an annotation viewer (90) including an annotation display area (91) in which annotations (92) can be posted, an annotation entry control (93) which by user command (25) allows entry of an annotation (92) into an annotation entry area (95) and an annotation post control (94) which by user command (25) can post annotations (92) in the annotation display area (91).

While the illustrative example of the reviewer graphical user interface (46) makes discrete or separates the submission display area (84), the annotation display area (91), and the annotation entry area (95), this does not preclude embodiments in which the one or more of these areas overlap. For example, the annotation display area (91) or the annotation entry area (95) can be depicted over the submission display area (91).

Again, referring primarily to FIG. 2, in the illustrative example in which the submission display area depicts video content (43), a reviewer (17) by user command (25) can use the play control (86) to start play of the video content (43).

Figure 3:
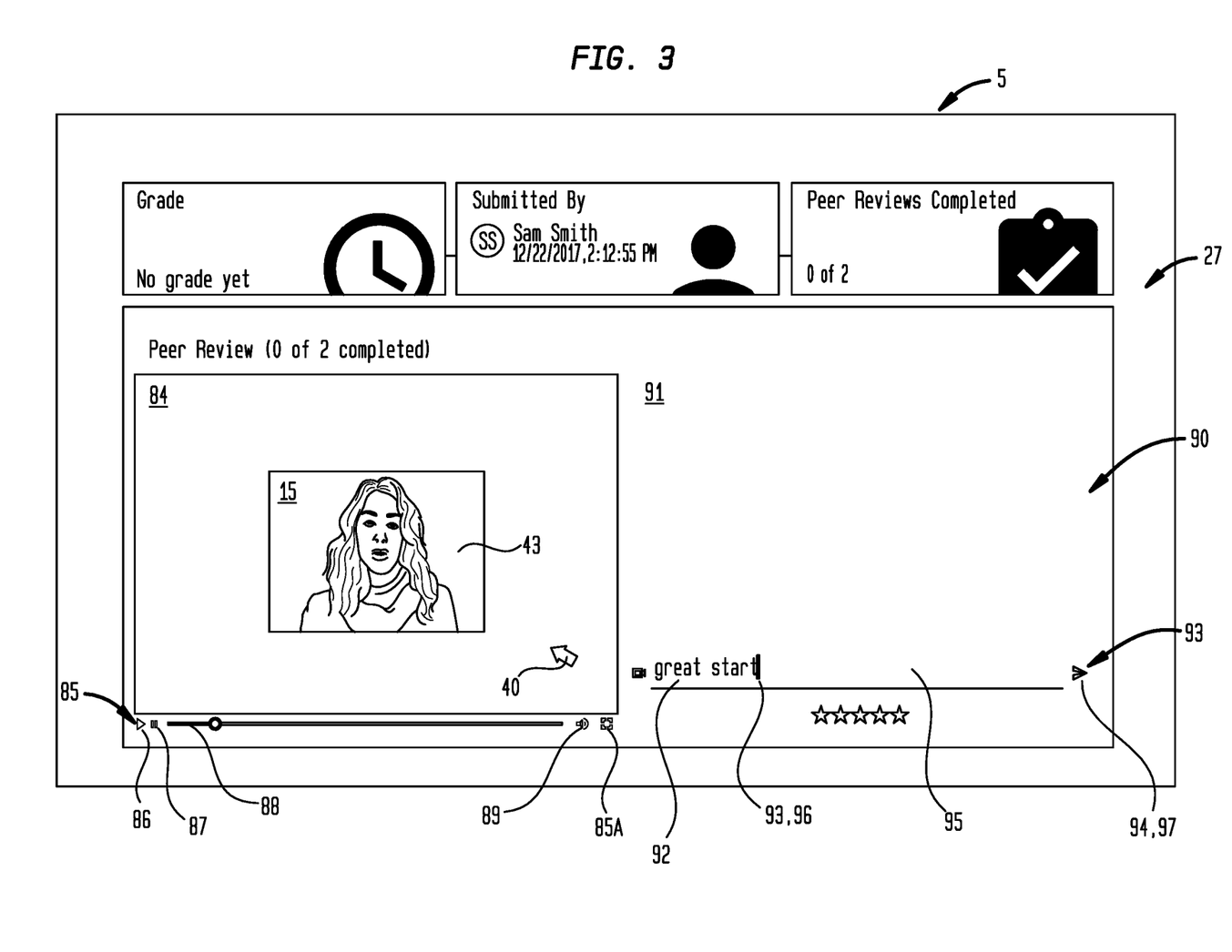
FIG. 3 is an illustration of the particular embodiment of a reviewer graphical user interface as shown in FIG. 2 depicting entry of an annotation.

Now referring primarily to FIG. 3, in particular embodiments, the annotation entry control (93) can take the form of an annotation entry cursor (96) in an annotation entry area (95). In particular embodiments, placement of the cursor (96) in the annotation entry area (95) stops play of the video content (43) in the submission display area (84). However, this does not preclude the use of other forms of user command (25) to allow entry of an annotation (92), such as touch control, voice control, pointer and click event over an annotation icon, or the like. The reviewer (17) can enter an annotation (92) into the annotation entry area (95) by keystroke; however, this does not preclude other forms of user command (25) to enter an annotation (92) into the annotation entry area (95), such as selection of an annotation (92) from a drop down list, or file list, drag and drop, or the like. While in the illustrative embodiment, the annotation (92) comprises a notation, explanation or comment relating to the video content (43) depicted in the submission display area (84) entered by keystroke; this does not preclude embodiments in which the annotation (92) comprises one or more of attached images, documents, videos, audio or other content.

Figure 4:
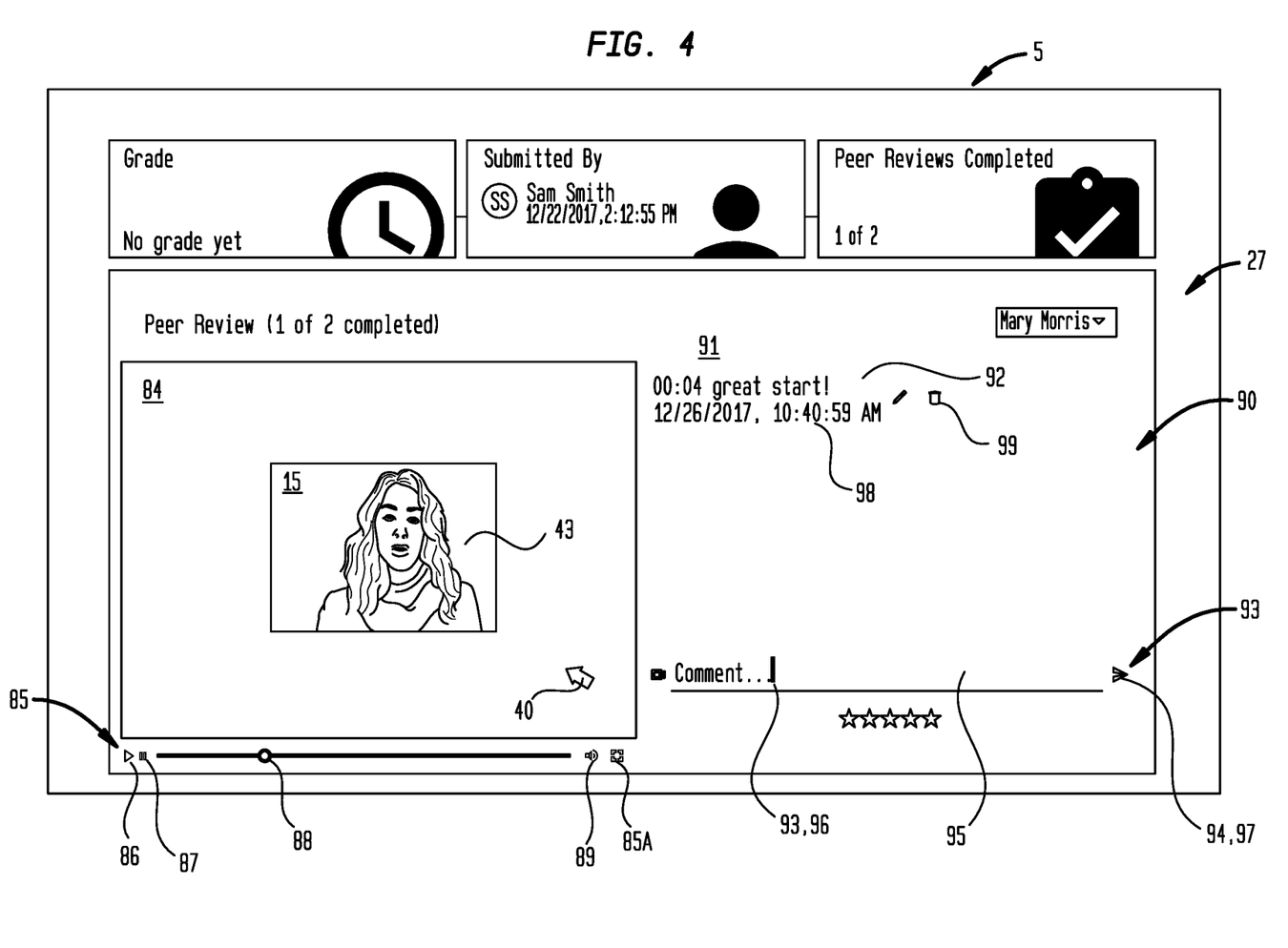
FIG. 4 is an illustration of the particular embodiment of a reviewer graphical user interface as shown in FIG. 2 depicting posting of the annotation.

Now referring primarily to FIG. 4, in particular embodiments the program can further in include the annotation post control (94) can be operated by user command (25) to post the annotation (92) in the annotation display area (91). In the illustrative example, the annotation post control (94) can be activated by a user command (25) in the form of a point and click event over an annotation post icon (97) (depicted in the illustrative example as an ">" icon in the annotation entry area (95)). In particular embodiments, a date and time stamp (98) can be generated upon posting the annotation (92) and in particular embodiments the date and time stamp (98) can be depicted with the annotation (92) depicted in the annotation display area (91). Once posted, the annotation (92) can persist in the annotation display area (91) until removed by user command (25) in the form of a click event in a delete icon (99).

Figure 5:
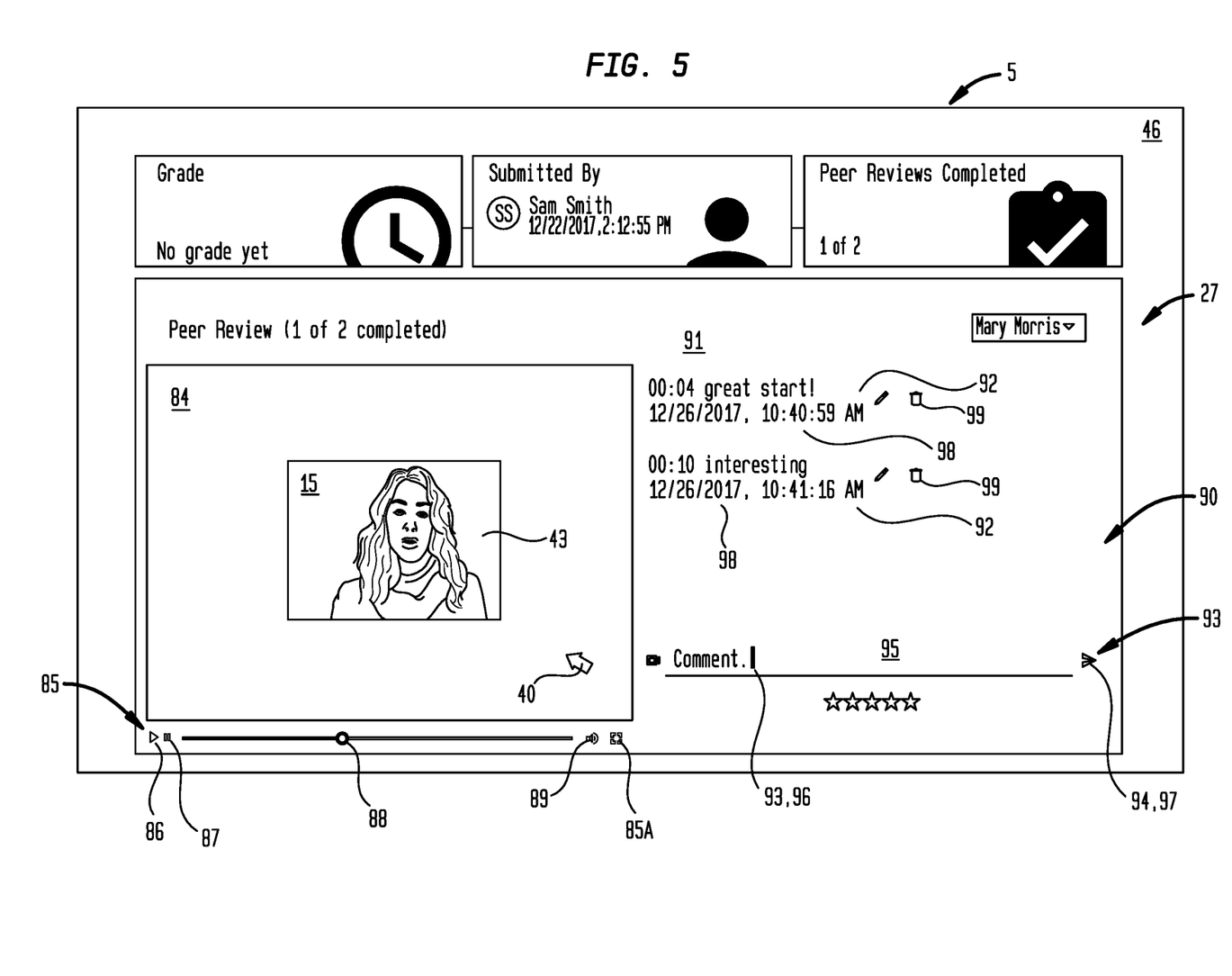
FIG. 5 is an illustration of the particular embodiment of a reviewer graphical user interface as shown in FIG. 2 depicting a plurality of posted annotations.

Now referring primarily to FIG. 5, the reviewer (17) by user command (25) can operate the play control (86) to restart play of the video content (43) in the submission display area (84). The reviewer (17) can, but need not necessarily, repeatedly enter and post annotations (92) in review of the submission (15) by user command (25) of the annotation entry control (93) and the annotation post control (94).

Figure 6:
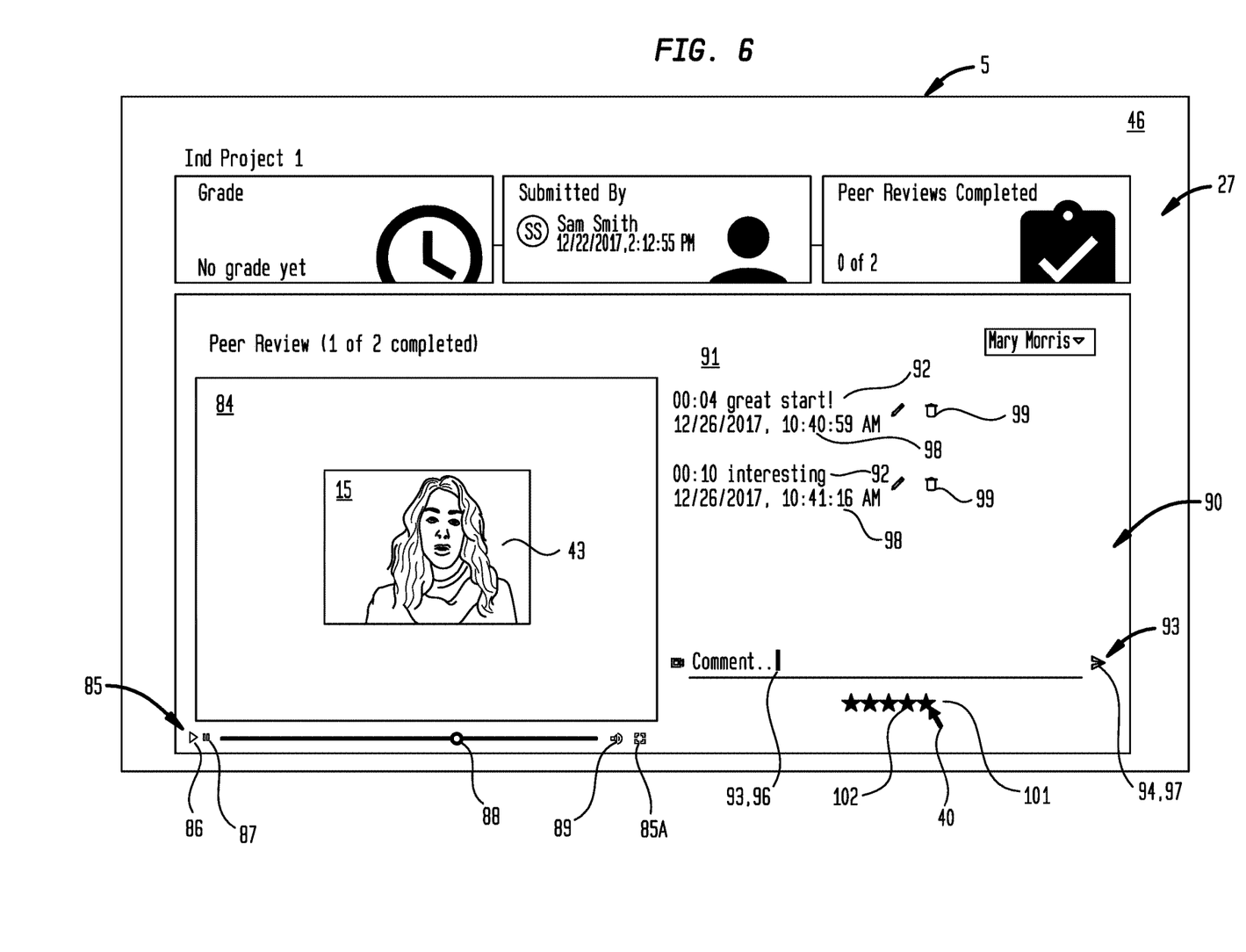
FIG. 6 is an illustration of the particular embodiment of a reviewer graphical user interface as shown in FIG. 2 depicting submission evaluation control elements including a selectable graded series of valuation elements.

Now referring primarily to FIG. 6, the reviewer graphical user interface (46) can, but need not necessarily, include a submission valuation control (100) which by user command (25) the reviewer (17) can enter a submission valuation (101). While the illustrative example, depicts a selectable graded series of valuation elements (102) with the greater number of valuation elements (102) selected representing a higher submission valuation (101); this is not intended to preclude any manner of comparative valuation scheme, for example, entered or selectable letter grades, fillable bars, or the like.

Figure 7:
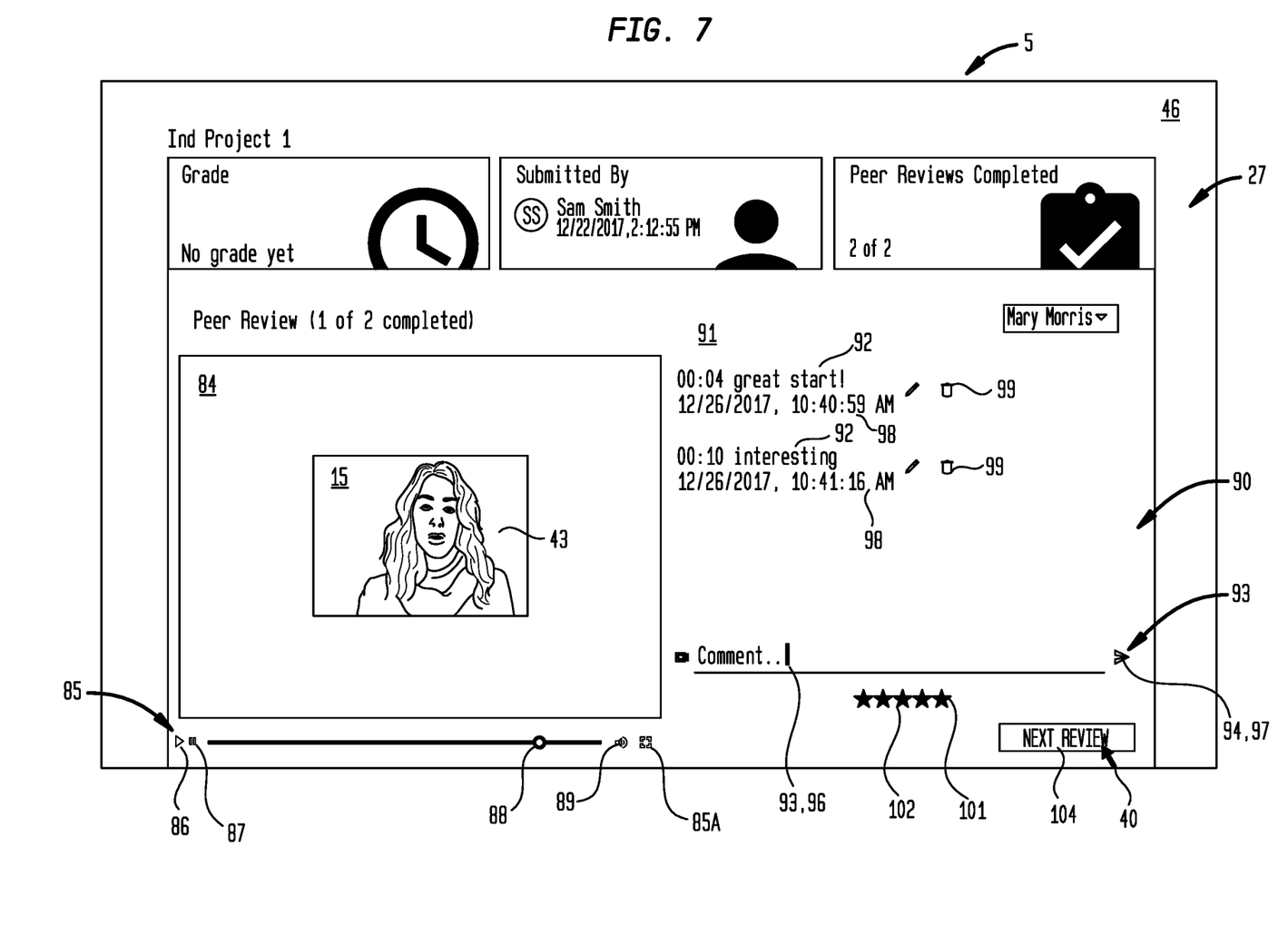
FIG. 7 is an illustration of the particular embodiment of a reviewer graphical user interface as shown in FIG. 2 depicting submission retrieval control element operable to retrieve and serially depict a plurality of submissions for submission review.

Now referring primarily to FIG. 7, in particular embodiments, upon completion of review of the submission (15) (shown in the example of FIG. 7 as completion of play of the video content (43)), a submission retrieval control (103) can be activated to depict a submission retrieval control icon (104) which by user command (25) can function to retrieve and depict a second submission (15) for review by the reviewer (17).

While the submission server module (75) in the prior illustrative example repeatedly serves a plurality of submissions (15) within a submission group (65) until each of the plurality of submissions (15) in a submission group (65) receives the pre-selected target number (19) of submission reviews (14); this does not preclude embodiments in which the submission server module (75) repeatedly serves a plurality of submissions (15) within a submission group (65) until each of the plurality of reviewers (17) in a roster of reviewers (65) has performed a pre-selected target number (19) of submission reviews (14). As to these embodiments, the submission review module (55) can, but need not necessarily be executed, to have the plurality of submissions (17) in a submission group (65) served to the plurality of reviewers (17) in roster of reviewers (65) in prioritized order (20) until each of the reviewers (17) in a roster of reviewers (65) has performed a pre-selected target number (19) of submission reviews (14). In particular embodiments, the submission priority order module (76) functions to prohibit submission review (14) of a submission (15) by the submitter (16) of the submission (15). In particular embodiments, the submission priority order module (76) can further function to determine a number of submission reviews (14) associated with each reviewer (17) in a roster of reviewers (65) and serve the plurality of submissions (15) in the submission group (66) to the plurality of reviewers (17) in roster of reviewers (65) based on having performed a fewest number of submission reviews (14) within the roster of reviewers (65). In particular embodiments, if two or more reviewers (17) have in common the fewest number of submission reviews (14), the submission priority order module (76) can further function to determine which of the reviewers (17) performed the earliest submission review (14) and serve the plurality of submissions (15) in the submission group (66) to the reviewer (17) in a roster of reviewers (65) based having performed the earliest submission review date (105). In particular embodiments, the submission priority order module (76) can further include submission review rank module (78) which generates a plurality of submission review ranks (79) corresponding to the pre-selected target number (19) of submission reviews (14). As to these embodiments, the submission server module (75) repeatedly serves each of the plurality of submissions (15) in the submission group (66) to the plurality of reviewers (17) in a roster of reviewers (65) until each one of the plurality of reviewers (17) in a roster of reviewers (65) receives a submission review (14) in a first one of the plurality of submission review ranks (79A) prior to serving each of the plurality of submissions (15) in the submission group (66) to the plurality of reviewers (17) in a second one of the plurality of submission review ranks (79B).

Figure 8:
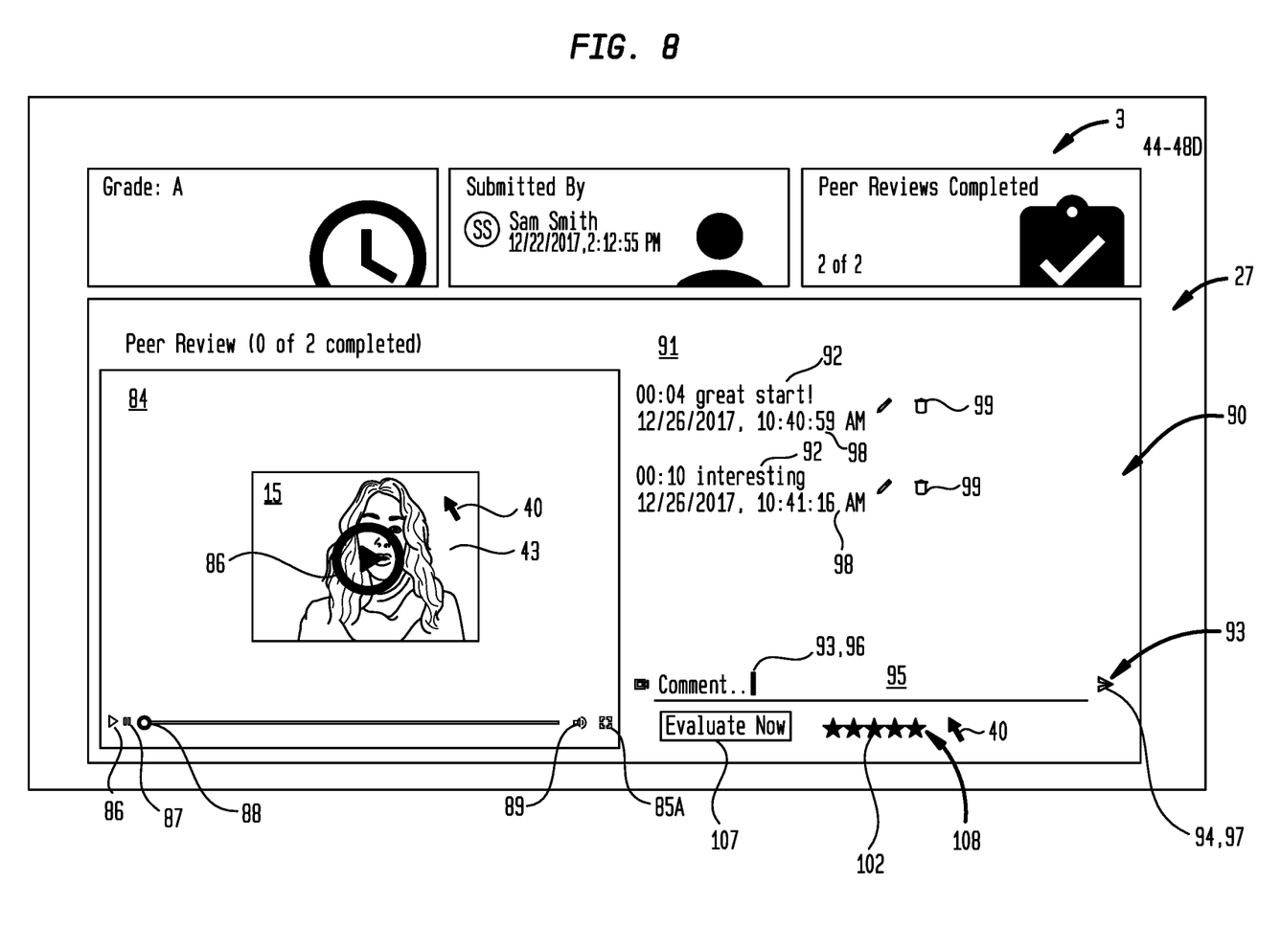
FIG. 8 is an illustration of the particular embodiment of an administrator graphical user interface depicted on a display surface of a computing device including administrator submission review evaluation controls.
Figure 9:
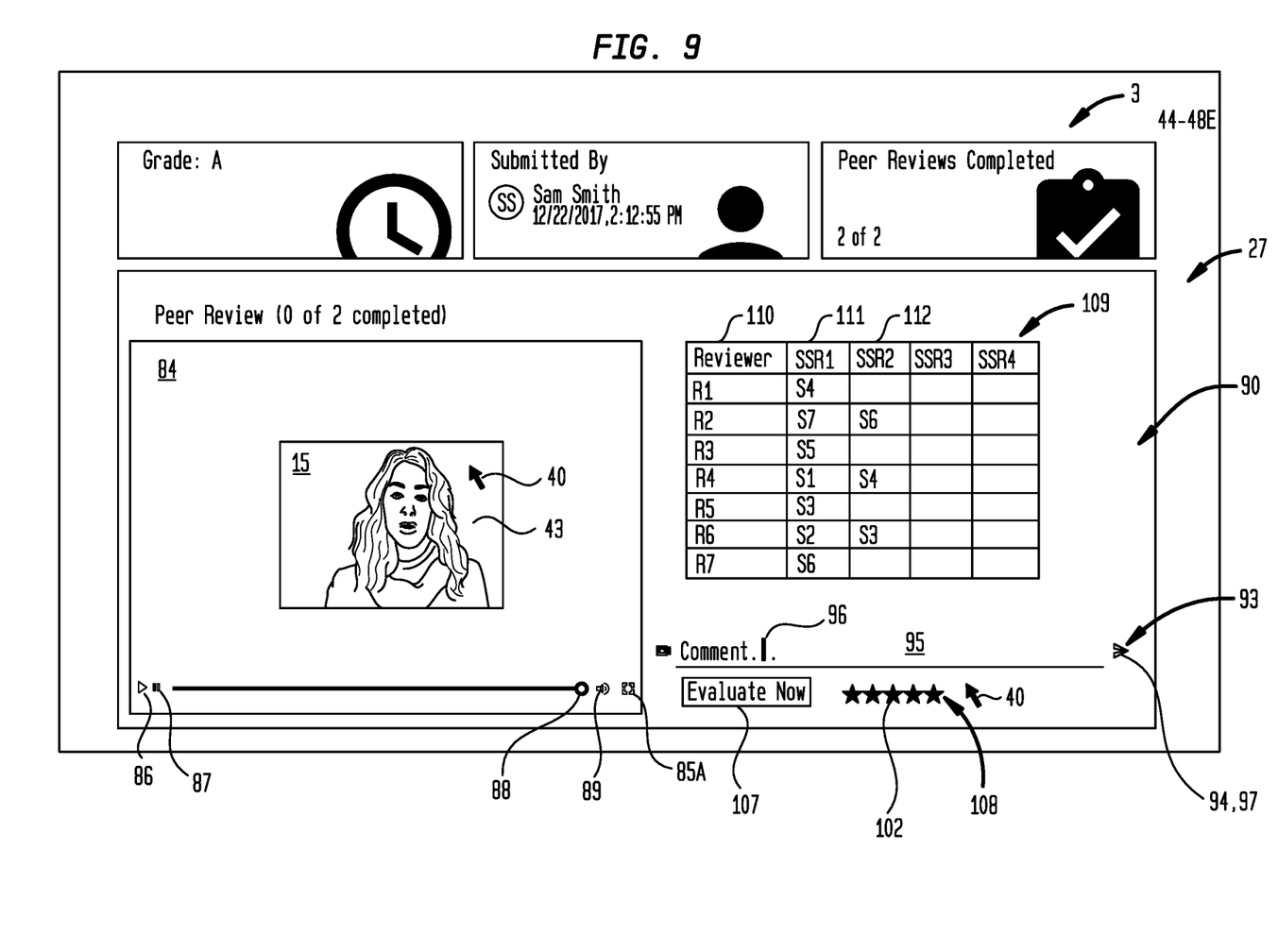
FIG. 9 is an illustration of a particular embodiment of an administrator graphical user interface shown in FIG. 8 which depicts an embodiment of a submission review status tracking table.

Now referring primarily to FIGS. 1 and 8 through 9, in particular embodiments, the administrator module (47) accessible or downloadable to an administrator computing device (3) can, but need not necessarily, further depict in the administrator graphical user interface (44) a submission evaluation menu (48D) on the display surface (27) of an administrator computing device (3). In particular embodiments, the submission evaluation menu (48D) can depict all of the features previously described for the reviewer graphical user interface (46) and having substantially the same functionalities. The submission evaluation menu (48D) can depict an evaluation initiation icon (107) (shown in the example of FIG. 8 as an "Evaluate Now" icon (107) which by user command (25) activates the submission priority order module (76) which can function to prohibit an administrator (12) from self-selecting submissions (15) for submission evaluation (108). In particular embodiments, the administrator (12) can be the administrator (12) that prepared the assignment (13) including one or a plurality of submissions (15) to be submitted by each of a plurality of submitters (16) in a submitter group (66) which can include a plurality of students. In these embodiments, submission evaluation (108) can, but need not necessarily comprise, submission valuation (101) in which one of a selectable graded series of valuation elements (102) can be associated with the submission (15). Again, while the valuation elements (102) can comprise conventional valuation elements (102) such as "A", "B", "C"; this is not intended to preclude any manner of comparative valuation scheme including entered or selectable valuation elements, for example, numerical elements such as "1", "2", "3", fillable bars, or as above described.

In particular embodiments, the submission priority order module (76) can function to prioritize order (20) of the plurality of submissions (15) served to an administrator computing device (3) for submission evaluation (108) in random order. In particular embodiments, where an assignment (13) included submission review (14) of a plurality of submissions (15) by a roster of reviewers (65), the submission priority order module (76) can function prioritize order (20) of the plurality of submissions (15) served to the administrator computing device (3) to those having achieved the pre-selected target number (19) of submission reviews (14) or in which each reviewer (17) the roster of reviewers (65) has performed the pre-selected number (19) of submission reviews (14), or both.

Now referring primarily to FIGS. 1 and 9, in particular embodiments, the administrator module (47) can further depict an administrator submission review tracking menu (48E) which by user command (25) allows the status of each of a plurality of submissions (15) in each of a plurality of submission groups (66) referenced to an administrator identifier (49) to be depicted in the administrator submission review tracking menu (48E) of the administrator graphical user interface (44) on the display surface (27) of the administrator computing device (3).

As shown in the illustrative example of FIG. 9, and as above described, an administrator (12) can configure an assignment (13) in which each of seven submissions (15) in a submission group (66) must have submission review (14) performed in two submission review ranks (79) by seven reviewers (17) in a roster of reviewers (65). In particular embodiments, a tracking module (106) can depict a columns and rows table (109) including a roster of reviewers (65) including a plurality of reviewers (17) (depicted in a first column (110) "Reviewers" including reviewers (17) "R1" through "R7" and a second and third columns (111)(112) correspondingly including a first and second submission review rank (79B)(79C) depicted as "SRR 1" and "SRR 2"). Each of a plurality of submissions identifiers (61) (shown in the example as "S1" through "S7") correspondingly fill the open cells in each the row corresponding to the reviewer (17) having performed the submission review (14) (in the example "R1" has perform submission review (14) of "S4" and "R4" has performed submission review (14) of "S1" and "S4" based on the prioritized order (20) generated by operation of the submission priority order module (76). Once all of submissions (15) "S1" through "S7" have undergone submission review (14) in the first one of a plurality submission review ranks (79A) ("SRR 1"), then the submission priority order module (76), causes the plurality of submissions (15) ("S1" through "S7") to be served to the plurality of reviewers (17) ("R1" through "R7") in the second one of the plurality of submission review ranks (79B) ("SRR 2") based on priority order (20) generated by operation of the submission priority order module (76). In particular embodiments, the once submission review (14) in prioritized order (20) has been completed, the submission priority order module (76) can further operate to serve the plurality of submissions (15) in a submission group (66) to the administrator computing device (3) in the submission evaluation menu (48D) for submission evaluation (108).

As can be easily understood from the foregoing, the basic concepts of the present invention may be embodied in a variety of ways. The invention involves numerous and varied embodiments of a reduced bias submission review system (1) and methods for making and using such a reduced bias submission review system (1) and a reduced bias submission review program (11) including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "computer" should be understood to encompass disclosure of the act of "computing"—whether explicitly discussed or not—and, conversely, were there effectively disclosure of the act of "computing", such a disclosure should be understood to encompass disclosure of a "computer" and even a "means for computing." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) the reduced bias submission review program or system herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A method in computer implemented system, comprising:
   receiving a plurality of submissions from plurality of submitters;
   associating each of said plurality of submissions to a submission group;
   associating a target number of submission reviews to each of said plurality of submissions within said submission group;
   associating a plurality of reviewers to a reviewer roster;

repeatedly serving said plurality of submissions in said submission group to said plurality of reviewers in said reviewer roster until each of said plurality of submissions receives said target number of submission reviews associated with said submission group.

2. The method of claim 1, further comprising serving said plurality of submissions in said submission group to said plurality of reviewers in said reviewer roster in prioritized order.

3. The method of claim 2, further comprising serving said plurality of submissions in said submission group to said plurality of reviewers in said reviewer roster in priority order based on:
  determining a number of submission reviews associated with each one of said plurality of submissions within said submission group; and
  serving said plurality of submissions in said submission group to said plurality of reviewers based on having a fewest number of submission reviews within said submission group.

4. The method of claim 3, further comprising serving said plurality of submissions in said submission group to said plurality of reviewers in said reviewer roster in priority order based on:
  determining a submission date associated with each one said plurality of submissions within said submission group; and
  serving said plurality of submissions in said submission group to said plurality of reviewers based on having an earliest submission date.

5. The method of claim 1, further comprising:
  generating a plurality of submission review ranks corresponding to said to said target number of submission reviews; and
  receiving a submission review for each of said plurality of submissions in said submission group in a preceding one of said plurality of submission review ranks prior to receiving a submission review for any of said plurality of submissions in said submission group in a subsequent one of said plurality of submission review ranks.

6. The method of claim 5, further comprising:
  determining a number of reviews associated with each one of said plurality of reviewers in said reviewer roster; and
  serving said plurality of submissions in said submission group to said plurality of reviewers in said reviewer roster based on having a fewest submitted reviews within said plurality of reviewers.

7. The method of claim 6, further comprising correspondingly associating each submission review with said reviewer in said reviewer roster having performed said submission review.

8. The method of claim 7, further comprising retrieving submission reviews performed by said reviewer; and receiving edits of said submission reviews from said reviewer.

9. The method of claim 5, further comprising:
  serving a user interface to a client computer;
  depicting said user interface on a display surface;
  depicting a list submissions associated with a plurality of submission review ranks;
  depicting in each one of said plurality of submission review ranks a plurality of submission review indicator fields, one of said plurality of submission review indicator fields correspondingly associated with one of said plurality of submission in said list of submissions.

10. The method of claim 9, further comprising depicting, upon receiving a submission review, a submission review indicator in one of said plurality of submission review indicator fields corresponding to said submission reviewed.

11. The method of claim 1, wherein said plurality of submissions comprises electronic media content.

12. The method of claim 11, wherein said electronic media content is selected from the group consisting of: electronic text or graphics, video recordings, audio recordings, multimedia presentations, slide presentations, spreadsheets, or combinations thereof.

* * * * *